(12) United States Patent
Ha

(10) Patent No.: US 12,479,974 B2
(45) Date of Patent: *Nov. 25, 2025

(54) COMPOSITION AND METHOD FOR MICROBIAL CONTROL FOR USE WITH POLYMERS

(71) Applicant: MICROBAN PRODUCTS COMPANY, Huntersville, NC (US)

(72) Inventor: Mai Le Phuong Ha, Cornelius, NC (US)

(73) Assignee: MICROBAN PRODUCTS COMPANY, Huntersville, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 19/236,477

(22) Filed: Jun. 12, 2025

(65) Prior Publication Data

US 2025/0304764 A1    Oct. 2, 2025

Related U.S. Application Data

(62) Division of application No. 18/073,105, filed on Dec. 1, 2022, now Pat. No. 12,378,388.

(60) Provisional application No. 63/345,148, filed on May 24, 2022.

(51) Int. Cl.
   *C08K 5/09* (2006.01)
   *C08J 3/22* (2006.01)
   *C08K 5/05* (2006.01)
   *C08K 5/092* (2006.01)

(52) U.S. Cl.
   CPC .................... *C08K 5/05* (2013.01); *C08J 3/22* (2013.01); *C08K 5/09* (2013.01); *C08K 5/092* (2013.01); *C08J 2300/00* (2013.01); *C08J 2300/22* (2013.01)

(58) Field of Classification Search
   CPC ... C08K 5/05; C08K 5/09; C08K 5/092; C08J 3/22; C08J 2300/00; C08J 2300/22
   USPC ..................................................... 523/351
   See application file for complete search history.

(56) References Cited

U.S. PATENT DOCUMENTS

| | | |
|---|---|---|
| 3,921,581 A | 11/1975 | Brewer |
| 4,877,631 A | 10/1989 | Kaper et al. |
| 5,526,771 A | 6/1996 | Ito |
| 8,852,565 B2 | 10/2014 | Finke et al. |
| 9,149,019 B2 | 10/2015 | Everhart |
| 2014/0271757 A1 | 9/2014 | Agrawal et al. |
| 2016/0220728 A1* | 8/2016 | Adams ............. A61K 8/20 |
| 2017/0304182 A1 | 10/2017 | Kadir et al. |
| 2018/0118954 A1 | 5/2018 | Baries et al. |
| 2019/0124921 A1 | 5/2019 | Koehl et al. |
| 2020/0268624 A1 | 8/2020 | Hinrichs et al. |
| 2020/0305426 A1 | 10/2020 | Foster et al. |
| 2020/0352164 A1* | 11/2020 | Salama ............. A01N 37/40 |
| 2022/0041871 A1 | 2/2022 | Foster et al. |
| 2023/0383093 A1* | 11/2023 | Ha ................... C08K 5/05 |

FOREIGN PATENT DOCUMENTS

| | | |
|---|---|---|
| BR | PI-10099652 B1 | 7/2020 |
| CN | 107182808 A | 9/2017 |
| WO | 2016084078 A1 | 6/2016 |
| WO | 2020118240 A1 | 6/2020 |
| WO | 2021072473 A1 | 4/2021 |
| WO | 2021224317 A1 | 11/2021 |

OTHER PUBLICATIONS

International Preliminary Report on Patentability (IPRP) from International Application No. PCT/US2023/020786; mailed on Dec. 5, 2024; 11 pages.
Final Office Action (FOA) issued for U.S. Appl. No. 18/072,960; mailed on Jan. 28, 2025; 10 pages.
International Search Report (ISR) from International Application No. PCT/US2022/051643; dated Apr. 4, 2023; 2 pages.
Written Opinion (WO) from International Application No. PCT/US2022/051643; dated Apr. 4, 2023; 7 pages.
International Preliminary Report on Patentability (IPRP) from International Application No. PCT/US2022/051643; mailed on Jun. 20, 2024; 9 pages.
Notice of Allowance from U.S. Appl. No. 18/072,960; issued on Jun. 9, 2025; 9 pages.
Notice of Allowance from U.S. Appl. No. 18/073, 105; issued on Jun. 5, 2025; 9 pages.
Non-Final Office Action (NFOA) issued for U.S. Appl. No. 18/072,960; mailed on Sep. 10, 2024; 16 pages.
International Search Report (ISR) from International Application No. PCT/US2023/020786; dated Sep. 14, 2023; 4 pages.
Written Opinion (WO) from International Application No. PCT/US2023/020786; dated Sep. 14, 2023; 9 pages.
International Search Report (ISR) from International Application No. PCT/US2022/051645; dated Apr. 5, 2023; 4 pages.

* cited by examiner

Primary Examiner — Hannah J Pak
(74) Attorney, Agent, or Firm — Jason A. Smith; Shumaker, Loop & Kendrick, LLP

(57) ABSTRACT

A composition having an additive or component having an antimicrobial or a preservative property, and 3-phenylpropanol or a member of the phenylpropanoid family is provided. A composition having a polymer, an organic acid, and 3-phenylpropanol or a member of the phenylpropanoid family is provided as well as a method(s) of using.

2 Claims, No Drawings

COMPOSITION AND METHOD FOR MICROBIAL CONTROL FOR USE WITH POLYMERS

CROSS-REFERENCE TO RELATED APPLICATIONS

This application is a U.S. Divisional Application which claims priority from U.S. patent application Ser. No. 18/073,105 filed on Dec. 1, 2022, which claims priority from U.S. Provisional Patent Application No. 63/345,148, filed on May 24, 2022, in the United States Patent and Trademark Office. The disclosure of which is incorporated herein by reference in its entirety.

FIELD OF THE INVENTION

The invention relates to a method and a composition for microbial control for use with polymers, more particularly to a method and a composition using an additive or component having an antimicrobial or preservative property for microbial control for use with polymers.

BACKGROUND OF THE INVENTION

High-performance thermoplastics are often used in applications requiring high strength, durability, dimensional stability, and low friction.

An example of a high performance thermoplastics is acetal, also known as polyoxymethylene (POM). It has a high melting point and is susceptible to oxidation and acid hydrolysis. Another example of high performance thermoplastics is thermoplastics polyurethane (TPU). This material has a narrow processing window and also susceptible to acid hydrolysis. It is a common practice to molder to use pellet masterbatches of color, or other additives at a few percentages to create custom products. However, many high performance thermoplastics such as acetals or TPU are sensitive to acids and use of acidic additives could cause depolymerization.

Thus, there is a need for an alternative composition and method for use with high performance thermoplastics that provides microbial control yet overcomes such known processing problems and disadvantages.

SUMMARY OF THE INVENTION

The present invention relates to a composition and method for microbial control for use with polymers.

In an embodiment of the invention, a composition comprising an additive or component having an antimicrobial or a preservative property, and 3-phenylpropanol or a member of the phenylpropanoid family is provided.

The additive or component having the antimicrobial or the preservative property is Generally-Recognized-as-Safe (GRAS). The Generally-Recognized-as-Safe (GRAS) additive or component may be selected from the group consisting of a minimum risk pesticide, a food preservative, and a combination thereof. The food preservative may be an organic acid. The organic acid can be selected from the group consisting of benzoic acid, propionic acid, sorbic acid, citric acid, lactic acid, ascorbic acid, acetic acid, erythorbic acid, fumaric acid, malic acid, glycolic acid, derivatives thereof and a combination thereof. The organic acid may preferably be selected from the group consisting of benzoic acid, sorbic acid, citric acid, and a combination thereof. The member of the phenylpropanoid family is selected from the group consisting of a derivative of phenyl propane, a derivative of phenyl propene, and a combination thereof. The organic acid and the 3-phenylpropanol or a member of the phenylpropanoid family are present in a ratio of the organic acid to the 3-phenylpropanol or a member of the phenylpropanoid family in a range from 1:100 to 100:1, preferably in a range from 1:10 to 10:1.

In an embodiment of the invention, a composition comprising a polymer, an organic acid, and 3-phenylpropanol or a member of the phenylpropanoid family is provided.

The thermoplastic polymer may be selected from, but not limited to, the group consisting of polypropylene (PP), ethylene methyl acrylate copolymer (EMA), polyethylene (PE), styrene acrylonitrile (SAN), thermoplastic polyurethane (TPU), acrylonitrile butadiene styrene (ABS), polystyrene (PS), polycarbonate (PC), polyvinylchloride (PVC), polyoxymethylene (POM), nylon, polyacrylic, polyester, methyl methacrylate-acrylonitrile-butadiene-styrene (MABS), and a combination thereof.

In an embodiment of the invention, a method of use comprising adding 3-phenylpropanol or a member of the phenylpropanoid family into a thermoplastic polymer thereby reducing the processing temperature of the thermoplastic polymer is provided.

In an embodiment of the invention, a method of use comprising compounding an organic acid and 3-phenylpropanol or a member of the phenylpropanoid family with a thermoplastic polymer to form a compounded material is provided.

The compounded material may be in a form of a masterbatch. The method may further comprise using the masterbatch to mold an article having an antimicrobial effect.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

DESCRIPTION OF THE PREFERRED EMBODIMENTS

The following description of the embodiments of the present invention is merely exemplary in nature and is in no way intended to limit the invention, its application, or uses. The following description is provided herein solely by way of example for purposes of providing an enabling disclosure of the invention, but does not limit the scope or substance of the invention.

Further, the term "or" as used in this disclosure and the appended claims is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in," "at," and/or "on," unless the context clearly indicates otherwise. The phrase "in one embodiment," as used herein does not necessarily refer to the same embodiment, although it may.

The present invention is a composition and a method for microbial control for use with polymers. The composition exhibits an antimicrobial property.

In an embodiment of the invention, the composition comprises an additive or component having an antimicrobial or preservative property, more particularly a Generally-Recognized-as-Safe (GRAS) additive or component, and 3-phenylpropanol or a member of the phenylpropanoid family.

Examples of a GRAS additive or component include, but are not limited to, a minimum risk pesticide, a food preservative, among others.

In an embodiment of the present invention, the food preservative is an organic acid. Examples of organic acids include, but are not limited to, benzoic acid, propionic acid, sorbic acid, citric acid, lactic acid, ascorbic acid, acetic acid, erythorbic acid, fumaric acid, malic acid, glycolic acid, derivatives thereof and a combination thereof. Preferred organic acids include, but are not limited to, benzoic acid, sorbic acid, citric acid, and a combination thereof.

The phenylpropanoid family of 3-phenylpropanol may include, but is not limited to, a derivative of phenyl propane, a derivative of phenyl propene, and a combination thereof. It is noted that 3-phenylpropanol and the phenylpropanoid family are organic compounds.

In an aspect of the invention, the organic acid and the 3-phenylpropanol (or a member of the phenylpropanoid family) are present in a ratio of organic acid to 3-phenylpropanol (or a member of the phenylpropanoid family) in a range from 1:100 to 100:1, preferably 1:10 to 10:1.

In an embodiment of the invention, the composition comprises a polymer, an organic acid, and 3-phenylpropanol (also known as 3-phenyl-1-propanol) or a member of the phenylpropanoid family.

The polymer is preferably a thermoplastic polymer. Examples of thermoplastic polymers include, but are not limited to, polypropylene (PP), ethylene methyl acrylate copolymer (EMA), polyethylene (PE), styrene acrylonitrile (SAN), thermoplastic polyurethane (TPU), acrylonitrile butadiene styrene (ABS), polystyrene (PS), polycarbonate (PC), polyvinylchloride (PVC), polyoxymethylene (POM) (also referred to as acetal), nylon, polyacrylic, polyester, methyl methacrylate-acrylonitrile-butadiene-styrene (MABS), and a combination thereof.

It has unexpectedly been found that there is a synergistic antimicrobial effect between a GRAS antimicrobial/preservative and 3-phenylpropanol. The synergistic effect allows the use of the antimicrobial at lower levels and in materials that otherwise are not feasible.

Experiments were done with benzoic acid and 3-phenylpropanol. However, a synergistic effect may also occur between the extended phenylpropanoid family of 3-phenylpropanol and benzoic acid as well as with other GRAS acid antimicrobials such as citric acid, sorbic acid, and a combination thereof.

In an aspect of the invention, benzoic acid (GBA) and 3-phenylpropanol (or a member of the phenylpropanoid family) are present in a ratio of benzoic acid (GBA) to 3-phenylpropanol (or a member of the phenylpropanoid family) in a range from 1:100 to 100:1, preferably 1:10 to 10:1.

In an embodiment of the invention, a method of using is provided. The method comprises adding 3-phenylpropanol or a member of the phenylpropanoid family into a thermoplastic polymer thereby reducing a processing temperature of the thermoplastic polymer.

It has unexpectedly been found that 3-phenylpropanol aids in lowering the melt temperature of the polymer.

In an embodiment of the invention, a method of using is provided. The method comprises compounding an organic acid and 3-phenylpropanol or a member of the phenylpropanoid family with a thermoplastic polymer to form a compounded material. Compounding generally refers to mixing and/or blending polymer and additives in a molten state. The acid and 3-phenylpropanol (or a member of the phenylpropanoid family) combined are present in an amount of 0.01 weight % to 50 weight %, based on the weight of the total composition.

The method may further comprise using the compounded thermoplastic polymer with the acid and 3-phenylpropanol or a member of the phenylpropanoid family as a masterbatch in a molding process to mold an article having a resulting antimicrobial effect.

Example 1

TABLE 1

Antimicrobial efficacy of TPU with GBA against *Escherichia coli* (gram-negative bacteria) using ISO22196 test method.

| Sample descriptions | Viable organisms *Escherichia coli* | Average log reduction |
|---|---|---|
| TPU control, replicate 1 | 110,000 | — |
| TPU control, replicate 2 | 150,000 | |
| TPU control, replicate 3 | 130,000 | |
| TPU with 4500 ppm GBA, replicate 1 | 36,000 | 0.9 |
| TPU with 4500 ppm GBA, replicate 2 | 16,000 | |
| TPU with 4500 ppm GBA, replicate 3 | 8,300 | |
| TPU with 5250 ppm GBA, replicate 1 | 33,000 | 1.7 |
| TPU with 5250 ppm GBA, replicate 2 | 4,500 | |
| TPU with 5250 ppm GBA, replicate 3 | <100 | |
| TPU with 6000 ppm GBA, replicate 1 | 4,500 | 2.6 |
| TPU with 6000 ppm GBA, replicate 2 | <100 | |
| TPU with 6000 ppm GBA, replicate 3 | <100 | |

As demonstrated in Table 1. GBA only exhibited consistent antimicrobial efficacy (>1 log reduction) against *E. coli*. at 5250 ppm level in TPU.

TABLE 2

Antimicrobial efficacy of TPU with GBA and 3-phenyl propanol against *Escherichia coli* (gram-negative bacteria) using ISO22196 test method.

| Sample descriptions | Viable organisms *Escherichia coli* | Average log reduction |
|---|---|---|
| TPU control, replicate 1 | 2,100,000 | — |
| TPU control, replicate 2 | 680,000 | |
| TPU control, replicate 3 | 1,500,000 | |
| TPU with 2500 ppm GBA, replicate 1 | 4,900,000 | No reduction |
| TPU with 2500 ppm GBA, replicate 2 | 2,100,000 | |
| TPU with 2500 ppm GBA, replicate 3 | 2,100,000 | |
| TPU with 2000 ppm GBA + 2000 ppm 3-phenyl propanol, replicate 1 | 93,000 | 1.3 |
| TPU with 2000 ppm GBA + 2000 ppm 3-phenyl propanol, replicate 2 | 40,000 | |
| TPU with 2000 ppm GBA + 2000 ppm 3-phenyl propanol, replicate 3 | 93,000 | |
| TPU with 2500 ppm GBA + 2000 ppm 3-phenyl propanol, replicate 1 | 51,000 | 1.4 |
| TPU with 2500 ppm GBA + 2000 ppm 3-phenyl propanol, replicate 2 | 57,000 | |

TABLE 2-continued

Antimicrobial efficacy of TPU with GBA and 3-phenyl propanol against *Escherichia coli* (gram-negative bacteria) using ISO22196 test method.

| Sample descriptions | Viable organisms *Escherichia coli* | Average log reduction |
|---|---|---|
| TPU with 2500 ppm GBA + 2000 ppm 3-phenyl propanol, replicate 3 | 57,000 | |

As seen in Table 2, at 2500 ppm GBA, no efficacy against *E. coli* was observed. However, when 3-phenyl propanol was added to the material, bringing the total additive to 4500 ppm combined, the log reduction was 1.4, more than 4500 ppm GBA alone (less than 1). This demonstrates the synergetic effect of GBA and 3-phenyl propanol in TPU.

TABLE 3

Antimicrobial efficacy of TPU with GBA and 3-phenyl propanol against *Staphylococcus aureus* (gram-positive bacteria) using ISO22196 test method.

| Sample descriptions | Viable organisms *Staphylococcus aureus* | Average log reduction |
|---|---|---|
| TPU control, replicate 1 | 1,100,000 | — |
| TPU control, replicate 2 | 780,000 | |
| TPU control, replicate 3 | 780,000 | |
| TPU with 2500 ppm GBA, replicate 1 | 2,100,000 | No reduction |
| TPU with 2500 ppm GBA, replicate 2 | 1,700,000 | |
| TPU with 2500 ppm GBA, replicate 3 | 4,900,000 | |
| TPU with 2000 ppm GBA + 2000 ppm 3-phenyl propanol, replicate 1 | 200 | 2.5 |
| TPU with 2000 ppm GBA + 2000 ppm 3-phenyl propanol, replicate 2 | 17,000 | |
| TPU with 2000 ppm GBA + 2000 ppm 3-phenyl propanol, replicate 3 | 4,500 | |
| TPU with 2500 ppm GBA + 2000 ppm 3-phenyl propanol, replicate 1 | <100 | 3.9 |
| TPU with 2500 ppm GBA + 2000 ppm 3-phenyl propanol, replicate 2 | <100 | |
| TPU with 2500 ppm GBA + 2000 ppm 3-phenyl propanol, replicate 3 | <100 | |

Table 3 demonstrates that in TPU, GBA alone did not exhibit antimicrobial efficacy at more than 4500 ppm while the combination of 3-phenyl propanol and GBA at 4,000 ppm did. This demonstrates the synergetic effect of GBA and 3-phenyl propanol in TPU.

Example 2

(1) Masterbatch compounding:

GBA and 3-phenylpropanol were compounded into acetal at 1:1 ratio, 5 weight % each, wherein the weight percentages are based on the total weight of the GBA, 3-phenylpropanol and polymer.

3-phenylpropanol was found to lower the processing temperature and helped stabilize the process.

(2) The masterbatch was used at 2.5% at a molder to make products with final level of GBA and 3-phenylpropanol at 1250 ppm.

TABLE 4

Antimicrobial efficacy of GBA and 3-phenylpropanol combination against *Escherichia coli* (Gram-negative bacteria) in acetal using ISO22196 test method. This demonstrates the synergistic effect of GBA and 3-phenyl propanol in acetal.

| Sample descriptions | Viable organisms *Escherichia coli* |
|---|---|
| Acetal control, replicate 1 | >4,900,000 |
| Acetal control, replicate 2 | >4,900,000 |
| Acetal control, replicate 3 | >4,900,000 |
| Acetal with 1250 ppm GBA and 1250 ppm 3-phenylpropanol, replicate 1 | <100 |
| Acetal with 1250 ppm GBA and 1250 ppm 3-phenylpropanol, replicate 2 | <100 |
| Acetal with 1250 ppm GBA and 1250 ppm 3-phenylpropanol, replicate 3 | <100 |

TABLE 5

Antimicrobial efficacy of GBA and 3-phenylpropanol combination against *Staphylococcus aureus* (Gram-positive bacteria) in acetal using ISO22196 test method.

| Sample descriptions | Viable organisms *Staphylococcus aureus* |
|---|---|
| Acetal control, replicate 1 | 1500000 |
| Acetal control, replicate 2 | 2500000 |
| Acetal control, replicate 3 | 3000000 |
| Acetal with 1250 ppm GBA and 1250 ppm 3-phenylpropanol, replicate 1 | <100 |
| Acetal with 1250 ppm GBA and 1250 ppm 3-phenylpropanol, replicate 2 | <100 |
| Acetal with 1250 ppm GBA and 1250 ppm 3-phenylpropanol, replicate 3 | 8000 |

3-phenylpropanol is not known to be an antimicrobial. Minimum inhibitory concentration (MIC) of 3-phenylpropanol is 4000 ppm against *Staphylococcus aureus* and 3000-4000 ppm against *Escherichia coli*.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements.

What is claimed is:

1. A method of forming a masterbatch composition comprising:
    adding a benzoic acid and 3-phenylproanol or a member of the phenylpropanoid family into a thermoplastic polymer thereby reducing a processing temperature of the thermoplastic polymer;
    wherein the thermoplastic polymer is selected from the group consisting of polypropylene (PP), ethylene methyl acrylate copolymer (EMA), polyethylene (PE), styrene acrylonitrile (SAN), thermoplastic polyurethane (TPU), acrylonitrile butadiene styrene (ABS), polystyrene (PS), polycarbonate (PC), polyvinylchloride (PVC), polyoxymethylene (POM), nylon, polyacrylic, polyester, methyl methacrylate-acrylonitrile-butadiene-styrene (MABS), and a combination thereof; and wherein a ratio of the benzoic acid to the 3-phenylpropanol or a member of the phenylpropanoid family ranges from 1:10 to 10:1.

2. A method of forming a molded article having antimicrobial properties, comprising:

mixing a masterbatch composition with a polymer, and forming the molded article having antimicrobial properties, wherein the masterbatch composition comprises:

a benzoic acid;

3-phenylpropanol or a member of the phenylpropanoid family; and a thermoplastic polymer is selected from the group consisting of polypropylene (PP), ethylene methyl acrylate copolymer (EMA), polyethylene (PE), styrene acrylonitrile (SAN), thermoplastic polyurethane (TPU), acrylonitrile butadiene styrene (ABS), polystyrene (PS), polycarbonate (PC), polyvinylchloride (PVC), polyoxymethylene (POM), nylon, polyacrylic, polyester, methyl methacrylate-acrylonitrile-butadiene-styrene (MABS), and a combination thereof, and wherein a ratio of the benzoic acid to the 3-phenylpropanol or a member of the phenylpropanoid family ranges from 1:10 to 10:1.

* * * * *